US007413399B2

(12) United States Patent
Trewin

(10) Patent No.: US 7,413,399 B2
(45) Date of Patent: Aug. 19, 2008

(54) METHOD AND APPARATUS FOR DISTRIBUTING FLUID INTO A TURBOMACHINE

(75) Inventor: Richard Robert Trewin, Erlangen (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/305,905

(22) Filed: Dec. 19, 2005

(65) Prior Publication Data

US 2006/0228208 A1 Oct. 12, 2006

Related U.S. Application Data

(62) Division of application No. 10/605,959, filed on Nov. 10, 2003, now Pat. No. 7,033,135.

(51) Int. Cl.
*F01D 5/14* (2006.01)
(52) U.S. Cl. .................. 415/116; 415/115; 415/176; 415/179; 416/193 R; 60/226.1; 60/730; 60/806
(58) Field of Classification Search ............ 415/115, 415/116, 176, 179; 416/193 R; 60/226.1, 60/730, 805, 806
See application file for complete search history.

(56) References Cited

U.S. PATENT DOCUMENTS

| 2,549,819 | A | 4/1951 | Kane |
| 2,945,290 | A | 7/1960 | Walsh |
| 4,478,553 | A | 10/1984 | Leibowitz et al. |
| 4,714,414 | A | 12/1987 | Miller |
| 5,129,783 | A | 7/1992 | Hayton |
| 5,468,123 | A * | 11/1995 | Guimier et al. ............. 415/178 |
| 5,581,996 | A * | 12/1996 | Koch et al. .................... 60/782 |
| 5,619,855 | A * | 4/1997 | Burrus ......................... 60/736 |
| 5,630,700 | A | 5/1997 | Olsen et al. |
| 5,722,241 | A | 3/1998 | Huber |
| 5,930,990 | A | 8/1999 | Zachary et al. |
| 6,039,325 | A | 3/2000 | Steinetz et al. |
| 6,263,661 | B1 | 7/2001 | Van Der Burgt et al. |
| 6,295,803 | B1 * | 10/2001 | Bancalari .................... 415/114 |
| 6,398,518 | B1 | 6/2002 | Ingistov |
| 6,453,659 | B1 | 9/2002 | Van Liere et al. |
| 6,584,778 | B1 * | 7/2003 | Griffiths et al. ............... 60/782 |
| 6,659,715 | B2 | 12/2003 | Kuesters et al. |
| 6,890,151 | B2 | 5/2005 | Bertrand et al. |
| 2004/0115046 | A1 | 6/2004 | Murphy et al. |

* cited by examiner

*Primary Examiner*—Igor Kershteyn
(74) *Attorney, Agent, or Firm*—Ann M. Agosti; Patrick K. Patnode

(57) ABSTRACT

An apparatus for distributing a fluid in a gas flow path inside a turbomachine, comprising: a device for introducing the fluid into the gas flow path; and wherein the device is positioned within the gas flow path. A method for installing an apparatus that will distribute a fluid in a gas flow path inside a turbomachine, the method comprising: machining a casing groove along an inner surface of a casing; machining at least one port into the casing that is in fluid communication with the casing groove; machining an internal cavity in at least one stator blade that is in fluid communication with the casing groove; machining at least one orifice, that is in fluid communication with the internal cavity, on an orifice surface of the stator blade; and coupling a fluid supply to the at least one port.

10 Claims, 9 Drawing Sheets

METHOD AND APPARATUS FOR DISTRIBUTING FLUID INTO A TURBOMACHINE

CROSS REFERENCE TO RELATED APPLICATIONS

This application is a Division of U.S. patent application Ser. No. 10/605,959 entitled "Method and Apparatus for Distributing Fluid Into A Turbomachine" filed Nov. 10, 2003, now U.S. Pat. No. 7,033,135 which is herein incorporated by reference.

TECHNICAL FIELD

The current disclosed method and apparatus relate to an improvement in the operation of a turbomachine. More specifically, the improvement relates to the distribution of a fluid into the gas flow path inside of a turbomachine.

BACKGROUND OF THE INVENTION

Turbomachines are used in a variety of useful applications. Aviation, shipping, power generation, and chemical processing have all benefited from turbomachines of various designs. In regard to general terminology, the term "turbomachine" means any machine with one or more annular blade rows exchanging energy with the fluid crossing it. Examples of turbomachines are: fans, certain types of compressors, turbines, pumps and gas turbines.

Fluid materials such as water or cooled gas may be added to a turbomachine to increase the efficiency of the turbomachine. If water is added to a compressor or the compressor section of a gas turbine, such a procedure is identified as wet compression. Wet compression enables power augmentation in turbomachine systems by reducing the work required for compression of the inlet gas. This thermodynamic benefit is realized within a compressor through "latent heat intercooling", where water (or some other appropriate liquid) added to the gas inducted into the compressor cools that gas, through evaporation, as the gas with the added liquid is being compressed. The added liquid can be conceptualized as an "evaporative liquid heat sink" in this regard. The wet compression approach thus saves an incremental amount of work (which would have been needed to compress gas not containing the added liquid). The reduction in compressor work can be used to reduce the amount of fuel required to produce the same net output of a gas turbine (thus increasing the efficiency), or to increase the incremental amount of work available for the same gross output of the gas turbine, e.g. to drive a load attached to a turbomachine such as a generator (in the case of a single shaft machine) or to increase a compressor speed to provide more mass flow (which can have value in both single shaft and dual shaft machines).

An additional incremental contribution to power augmentation may be realized in the turbine section of a gas turbine, for instance, by a small increase in mass flow provided by the added vaporized liquid. A further incremental contribution to power augmentation also appears to be provided by an increase in gas flow which has been noted to occur with a first, 10-20 gallon per minute, increment of liquid in a large land-based power gas turbine. It should be noted that wet compression reduces the firing temperature of the turbine if the amount of fuel supplied is unchanged, and the reduced firing temperature reduces the gross output of the gas turbine. However, the reduction in compressor work is greater than the reduction in gross output of the gas turbine so that the net output of the gas turbine is increased. If the amount of fuel supplied is increased in order to raise the temperature of the cooled (respective to dry gas compression) gas/evaporated liquid mixture discharged from the compressor to the firing temperature of a gas turbine for dry compression; then the value realized from the wet compression effect is greater than the value of the additional fuel needed, resulting in value added to the operation of the system as a whole.

A risk of adding liquid to a turbomachine is blade erosion due to the impact of the liquid material on the rotating and non-rotating blades. Another difficulty with wet compression (especially in large gas turbine systems) relates to localized and non-uniform cooling (due to non-uniform distribution of the added liquid) within the turbomachine, which can distort the physical components of the turbomachine system in such a way as to cause damage from thermal stresses and from rubbing of the rotor against the inner wall of the housing and associated seals.

A further significant element of risk derives from the possibility of thermal shock if (1) the turbomachine has essentially achieved thermodynamic equilibrium and (2) the liquid addition is abruptly terminated without feed-forward compensation to the energy being added to the turbomachine; the risk is derived from a potentially damaging and abrupt transient in the internal operating temperature of the turbomachine if the evaporative liquid heat sink is removed in this manner.

Hydraulic atomizers that use the pressure of the liquid to produce droplets are commonly available, but either flow too little liquid or produce droplets that are too large. Heating the liquid so that it flashes as it leaves the atomizer can decrease the droplet size, but the rate of heat added to the liquid is equivalent to a large amount of power. Air-assisted atomizers are commonly available and can produce small droplets at a high flow rate of liquid into the gas flow path of a turbomachine, but the hardware is bulky and cannot be inserted in the gas flow path of a turbomachine without significantly disturbing the flow. Therefore, atomizers are inserted in the outer casing in order to avoid disturbing the flow. But the liquid droplets tend to remain near the outer casing due to the small size and low momentum of the droplets, so the droplets are poorly distributed, and this severely limits the efficiency improvement of adding liquid to the gas flow stream of a turbomachine. Another disadvantage is that the compression of the atomizing air used in air-assisted atomizers requires a large amount of power.

What is needed is an approach and system which enable the addition of liquid to a turbomachine to be implemented in turbomachine systems and which may reduce some or all of the disadvantages discussed above.

BRIEF DESCRIPTION OF THE INVENTION

An embodiment of the disclosed apparatus for distributing a fluid in a gas flow path inside a turbomachine, relates to a device for introducing the fluid into the gas flow path; and wherein the device is positioned within the gas flow path.

Additionally, another embodiment of the disclosed apparatus for distributing a fluid in a gas flow path inside a turbomachine relates to at least one stator blade in at least one turbomachine stage; a fluid channel in fluid communication with an interior of the stator blade; a fluid supply in fluid communication with the fluid channel; and at least one orifice located at an orifice surface of the stator blade, the orifice in fluid communication with the interior of the stator blade.

Furthermore, another embodiment of the disclosed apparatus for distributing a fluid in a gas flow path inside a turbomachine relates to at least one stator blade in at least one turbomachine stage; a gas channel; a fluid channel located at an interior of the stator blade, and configured to form a porous annulus around the gas channel to allow fluid from the fluid channel to pass into the gas channel; a fluid supply in fluid communication with the fluid channel; and at least one orifice located at an orifice surface of the stator blade, the orifice in fluid communication with the gas channel.

Also, an embodiment for the disclosed apparatus for distributing a fluid in a gas flow path inside a turbomachine relates to at least one stator blade in at least one turbomachine stage, the stator blade comprising a porous material throughout its in interior, and the porous material is exposed on a portion the stator blade's max pressure surface and a portion of the stator blade's orifice surface; a fluid channel located at the interior of the stator blade, and configured to provide fluid to the interior the stator blade; a fluid supply in fluid communication with the fluid channel; and wherein the stator blade is configured to admit gas from the gas flow path of the turbomachine via the max pressure surface and mix with fluid provided by the fluid channel, and the atomized fluid exits the stator blade through the orifice surface.

In addition, another embodiment of a disclosed apparatus for distributing a fluid in a gas flow path inside a turbomachine relates to at least one stator blade in at least one turbomachine stage, the stator blade comprising a cavity throughout a portion of its interior and a porous material on a portion of its orifice surface; a fluid channel located at the interior of the stator blade, and configured to provide fluid to the interior the stator blade; a fluid supply in fluid communication with the fluid channel; and wherein the stator blade is configured to accept fluid into its interior from the fluid channel, and allows the fluid to flow from the interior through the porous material of the orifice surface and enter the gas flow path of the turbomachine.

Further, another embodiment of the disclosed apparatus for distributing an atomized fluid in a gas flow path inside a turbomachine relates to a heat exchanger configured to heat a fluid from an external source; at least one stator blade in at least one turbomachine stage, the stator blade comprising a cavity throughout a portion of its interior; at least one atomizer located at an orifice surface of the stator blade, the atomizer communicatively coupled the cavity; and wherein the stator blade is communicably coupled to the heat exchanger to accept heated fluid into the cavity whereupon the heated fluid exits the cavity through the atomizer orifice and enters the gas flow path of the turbomachine.

A further embodiment of the disclosed apparatus for distributing a fluid in a gas flow path inside a turbomachine relates to a heat exchanger configured to heat a fluid from an external source; at least one stator blade in at least one turbomachine stage a tube located proximate to an orifice surface of the stator blade; at least one orifice located on a side of the tube, and the orifice communicatively coupled the cavity; and wherein the tube is communicably coupled to the heat exchanger to accept heated fluid into the cavity whereupon the heated fluid exits the cavity through the orifice and enters the gas flow path of the turbomachine.

An additional embodiment of the disclosed apparatus for distributing a fluid in a gas flow path inside a turbomachine relates to at least one stator blade in at least one turbomachine stage, the stator blade comprising at least one chamber; the chamber comprising a vibration plate that is operatively coupled to a vibration generator; a fluid channel located at the interior of the stator blade, and communicably coupled to the chamber; at least one orifice in fluid communication with the chamber, and located at an orifice surface of the stator blade; a fluid supply in fluid communication with the fluid channel; and wherein the chamber is configured to provide a pulsation to a fluid supplied to the chamber via the fluid channel, prior to the fluid exiting the chamber through the orifice to enter the gas flow path of the turbomachine.

Another embodiment of the disclosed apparatus for distributing a fluid in a gas flow path inside a turbomachine relates to at least one stage of a turbomachine, the stage comprising a 360 degree casing and at least one stator blade extending radially from an inner surface of the casing; a casing groove located at the inner surface of the casing; a stator blade cavity located at an interior of the stator blade, and in fluid communication with the casing groove; a port located at the casing and in fluid communication with the casing groove; and at least one orifice located at an orifice surface of the stator blade, the orifice in fluid communication with the stator blade cavity.

A further embodiment of the disclosed apparatus for distributing an atomized fluid in a gas flow path inside a turbomachine relates to at least one stage of a turbomachine, the stage comprising a 360 degree casing and at least one stator blade extending radially from an inner surface of the casing; a casing groove located at the inner surface of the casing; a stator blade cavity located at an interior of the stator blade, and in fluid communication with the casing groove; a port located at the casing and in fluid communication with the casing groove; and at least one atomizer with at least one orifice located at an orifice surface of the stator blade, the orifice in fluid communication with the stator blade cavity.

An other embodiment of the disclosed apparatus for distributing a fluid in a gas flow path inside a turbomachine relates to at least one stator blade in at least one turbomachine stage; a tube located proximate to an orifice surface of the stator blade; at least one orifice located on a side of the tube; and a fluid supply in fluid communication with the bayonet-like tube.

An embodiment of the disclosed method for installing an apparatus that will distribute a fluid in a gas flow path inside a turbomachine relates to machining a casing groove along an inner surface of a casing; machining at least one port into the casing that is in fluid communication with the casing groove; machining an internal cavity in at least one stator blade that is in fluid communication with the casing groove; machining at least one orifice, that is in fluid communication with the internal cavity, on an orifice surface of the stator blade; and coupling a fluid supply to the at least one port.

BRIEF DESCRIPTION OF THE DRAWINGS

Referring now to the figures, which are exemplary embodiments, and wherein like elements are numbered alike.

DETAILED DESCRIPTION OF THE INVENTION

A detailed description of several embodiments of the disclosed apparatus and method are presented herein by way of exemplification and not limitation with reference to FIGS. 1 through 17.

Air Foil Embodiment

Figure 1:
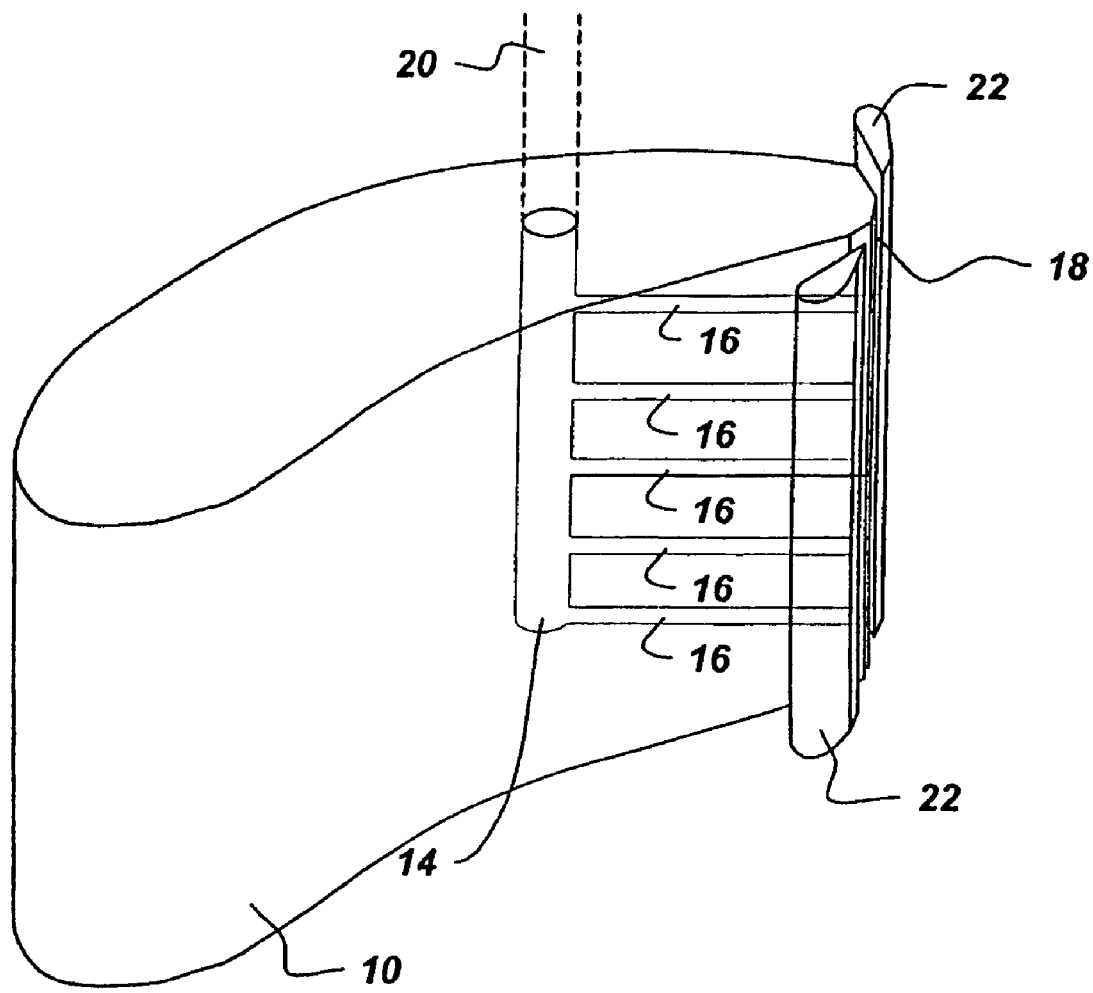
FIG. 1 depicts a perspective view of a stator blade and air foils.
Figure 2:
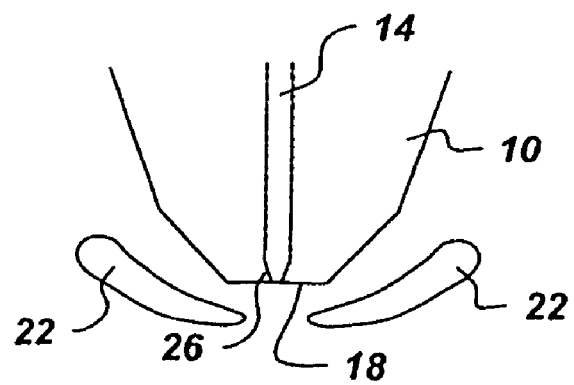
FIG. 2 depicts a top view of the stator blade and air foils.
Figure 3:
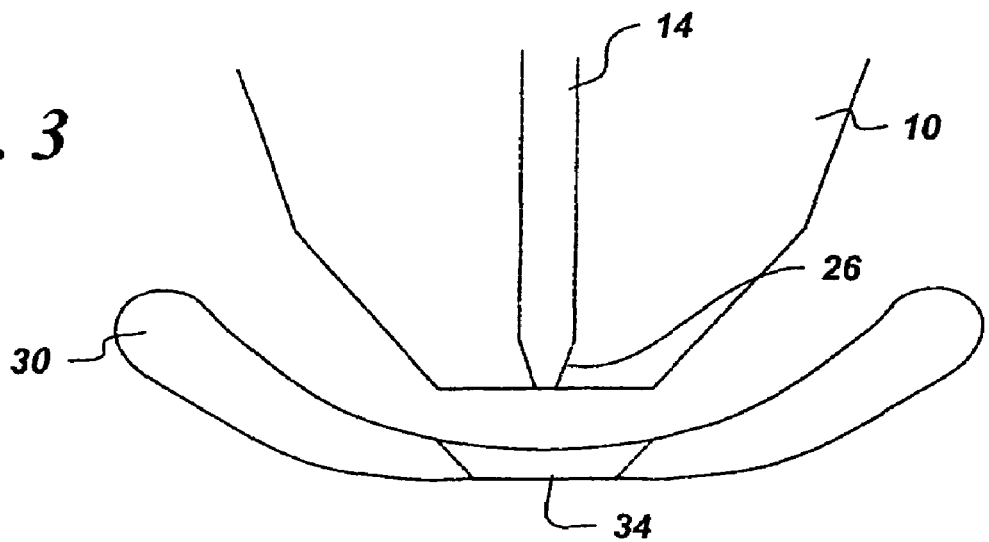
FIG. 3 depicts a top view of another embodiment a stator blade and air foil.
Figure 4:
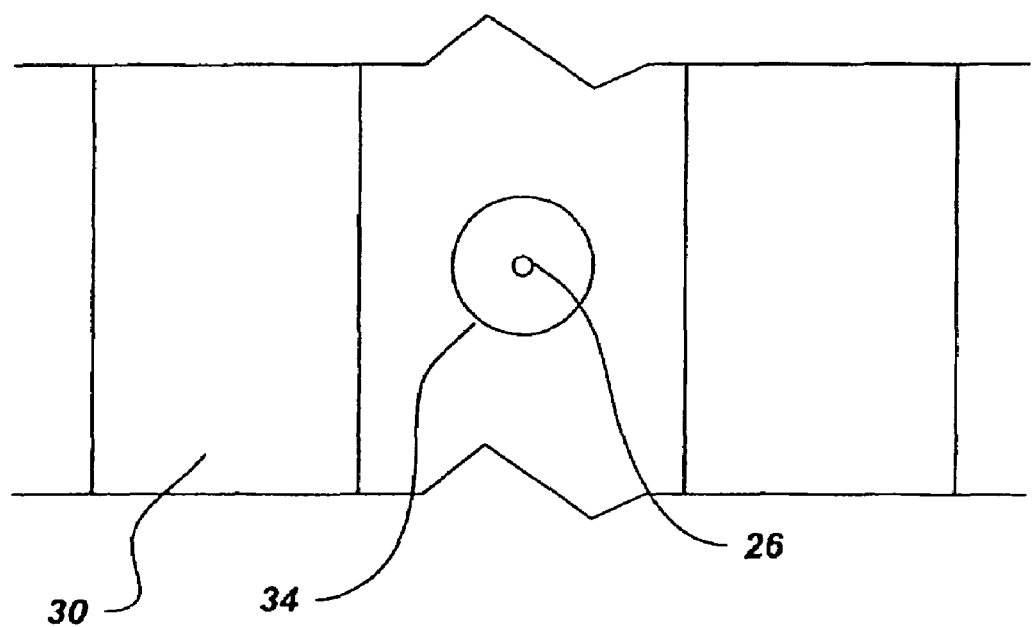
FIG. 4 depicts a front view of a air foil.
Figure 5:
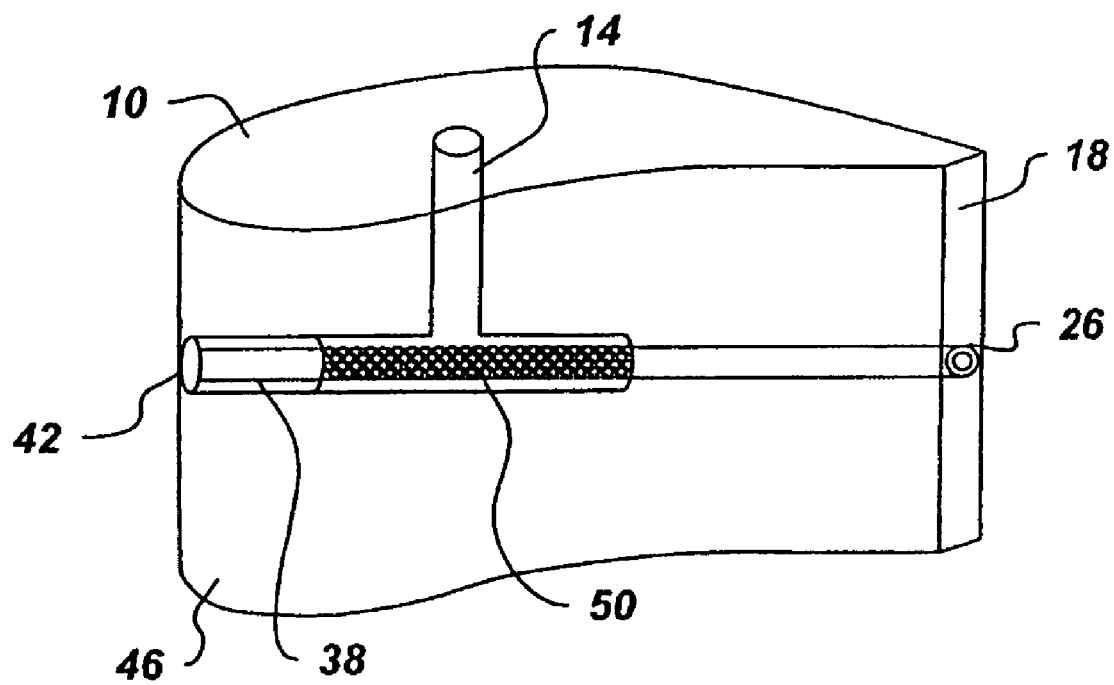
FIG. 5 depicts a perspective view of a stator blade with a reverse-effervescent apparatus.
Figure 6:
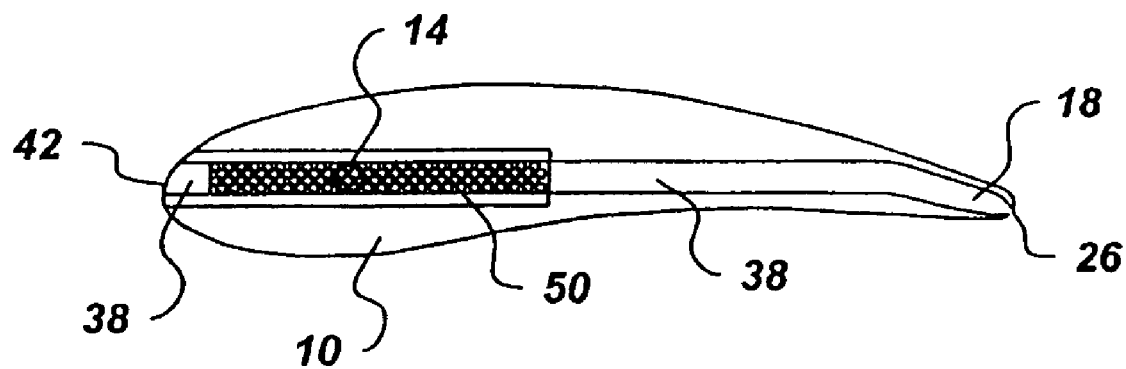
FIG. 6 depicts a top view of the stator blade from FIG. 5.
Figure 8:
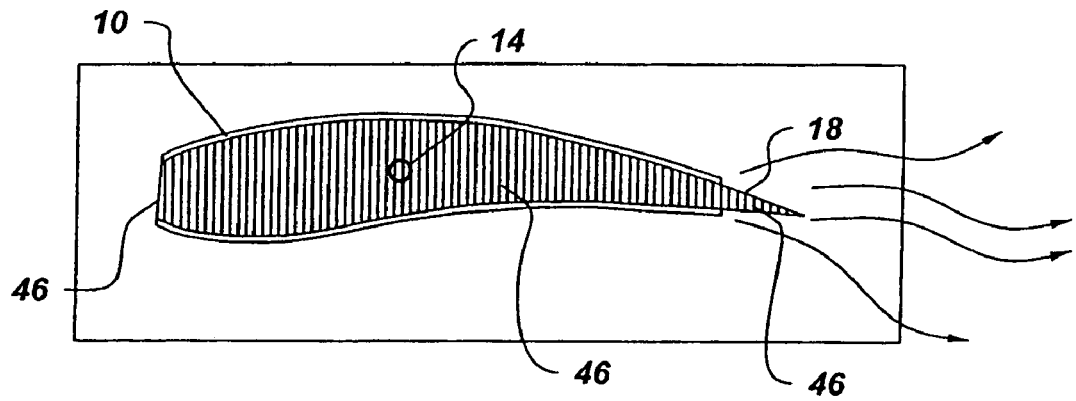
FIG. 8 depicts a top view of the stator blade from FIG. 7.
Figure 7:
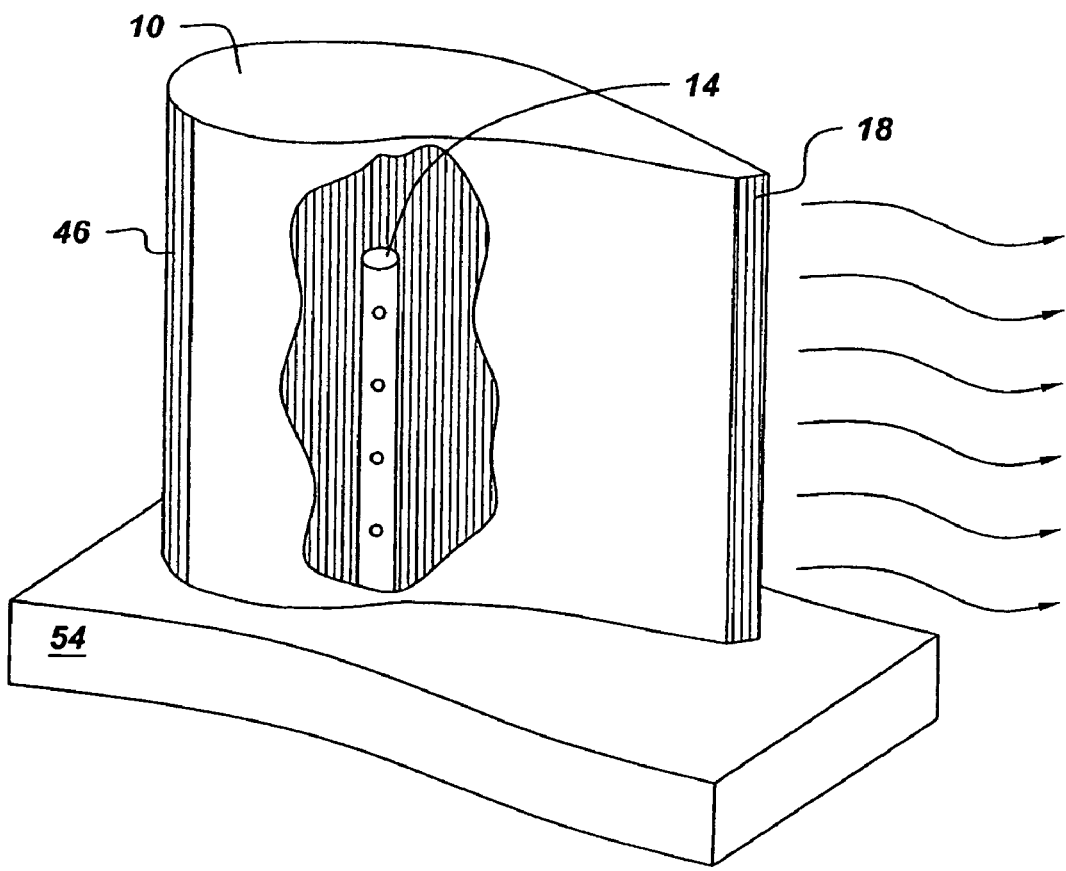
FIG. 7 depicts a perspective view of a stator blade comprising a porous material.
Figure 10:
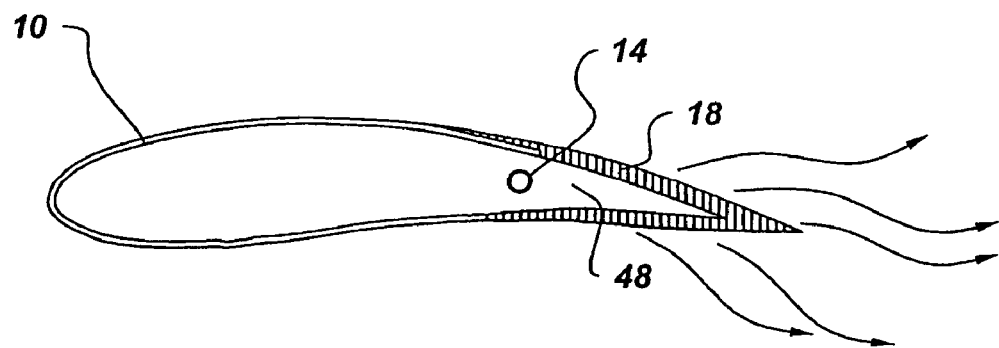
FIG. 10 depicts a top view of the stator blade from FIG. 9.
Figure 9:
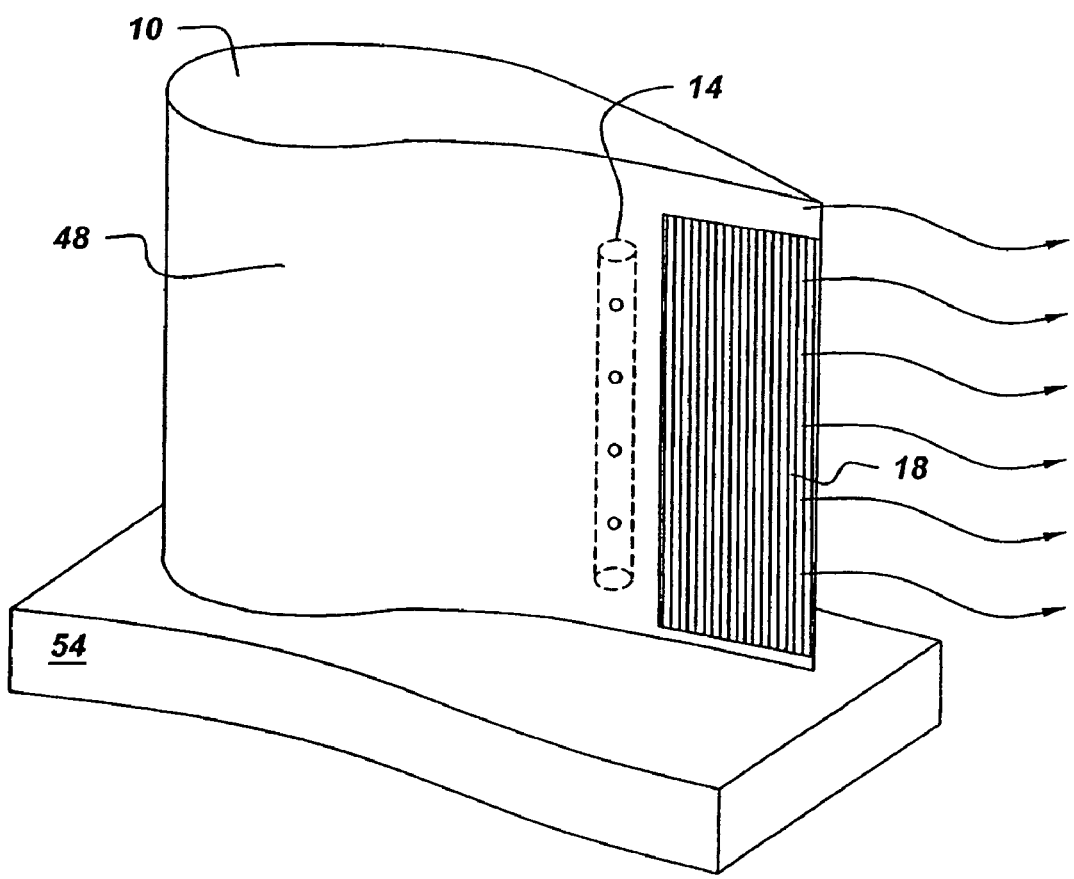
FIG. 9 depicts a perspective view of a stator blade with a porous material located at its trailing edge.

It is desired to introduce a fluid into the gas flow path of a turbomachine. If the fluid is a liquid, then as the liquid evaporates it cools the gas, thereby increasing the efficiency of the turbomachine. If the fluid is a cooled gas, then the cooled gas will cool the gas in the flow path of the turbomachine, thereby increasing the efficiency of the turbomachine, as well. It is also desired to atomize the liquid as it enters the flow path so that it is more readily able to evaporate. Atomizing a liquid means to break the liquid up into very small droplets. In addition, atomization of the liquid being added to the interior of a turbomachine is important for preventing the formation of large droplets of liquid which may cause erosion of blades in the turbomachine. Atomization of the liquid also allows for a more uniform distribution of the liquid throughout the turbomachine. FIG. 1 depicts one embodiment of the disclosed apparatus that helps atomize liquid added to the interior of a turbomachine. FIG. 1 shows a perspective view of one stator blade 10. Stator blades are also commonly known as vanes. Within the stator blade 10 are fluid channels 14. A liquid supply may be operably connected to fluid channels 14. In one embodiment, the liquid may be supplied to the fluid channels 14 via an external channel 20 through the casing of the turbomachine. The external channel may couple to an external liquid supply. The fluid channels 14 allow a liquid to exit the stator blade 10 through at least one orifice (not seen in FIG. 1, but shown in FIG. 2) distributed radially along an orifice surface 18 of the stator blade 10. This radial distribution of more than one orifice on a surface of the stator blade 10 increases the radial distribution of liquid throughout the gas flow path of the turbomachine. Typically, the leading edge of the stator blade has a higher pressure than the trailing edge, which typically has a lower pressure. Usually the largest pressure drop across the stator blade would be between the leading edge and the trailing edge. However, stator blades may be designed where the high pressure surface may not coincide with the leading edge, and/or the low pressure surface may not coincide with the trailing edge. Additionally, the largest pressure drops may not be required for the herein disclosed embodiments. Therefore, "an orifice surface" on a stator blade shall be that surface that provides the minimum necessary pressure drop with respect to a location with a differential pressure, such as a cavity in the stator blade or a surface on the stator blade, for an embodiment to function. Similarly, a surface identified as a max pressure drop surface on a stator blade is that surface that provides a maximum pressure drop with respect to an orifice surface for the disclosed embodiment to function.

In an embodiment, the fluid channels 14 may split into plurality of channels 16, and each of the channels 16 may be in fluid communication with an orifice on the trailing edge of the stator blade 10. There may be more or fewer channels 16 depending on various factors such as; but not limited to, the size of stator blade and the amount of liquid determined necessary to be injected into the turbomachine. Located proximal to the orifice surface 18 are two air foils 22. The air foils 22 assist in atomizing the liquid exiting at the orifice surface 18. This mechanism of atomization is analogous to the mechanism of atomization known with respect to air-assisted atomizers, such as air-assisted nozzles. The mechanism of atomization in both air-assisted atomization and in the herein air foil disclosure is that a gas with a high relative velocity is made to interact with a liquid that has a low relative velocity. A sheer stress develops at the interface between the gas and the liquid. The sheer stress sets up perturbations in the liquid, which eventually causes the liquid to break up into small droplets, thereby atomizing the liquid. Thus, the gas that is traveling around the stator blade 10 is analogous to the external atomizing air used in air-assisted atomization. The gas traveling around the stator blade is thus directed by the air foils 22 to interact with the liquid exiting the orifices on the orifice surface 18 of the stator blade 10. The gas has a very high velocity relative to the liquid exiting the orifice, and thus atomizes the liquid. In another embodiment, the air foils 22 comprise the same materials used to make the stator blade 10. In one embodiment, the air foils 22 extend from the inner shell of the turbomachine, in a fashion similar to the way the stator blades 10 extend from the inner shell of the turbomachine.

Delivering liquid to the interior of the stator blades and out through orifices located at the orifice surface 18 of the stator blades has the advantage of providing an extremely uniform distribution of the liquid throughout the gas flow path of the turbomachine. This advantage is increased when every stator blade in a stage has orifices providing liquid to the gas flow path of a turbomachine.

FIG. 2 shows a top view of the embodiment shown FIG. 1. In this view the orifice 26 can be seen on the orifice surface 18. In one embodiment, where the turbomachine is a 175 MW gas turbine, the flow rate of liquid to each stator blade in one stage is about 0.01 lbs/sec and the orifice 26 is about 10 mils in diameter. FIG. 3 shows another embodiment of the air foil/stator blade arrangement. Stator blade 10 is shown with a fluid channel 14 and an orifice 26. However, in this embodiment, rather than there being two air foils 22 adjacent to the stator blade 10, there is a single bi-flow air foil structure 30. The single bi-flow air foil structure 30 has at least one large orifice 34, which is larger and collinear to each orifice 26. Thus, when liquid exits any of the orifices 26, it is acted upon by the gas being directed towards it by the air foil structure 30. The liquid is then directed to and through a respective large orifice 34. In an embodiment, the orifice 26 may be 10 mils in diameter and the larger orifice 34 may be about 100 mils in diameter. This process assists in atomizing the liquid. FIG. 4 is a partial front view of the air foil structure.

Thus, the above embodiments illustrate an apparatus for distributing an atomized liquid in a gas flow path inside a turbomachine. With orifices distributed radially along the stator blade 10, the atomized liquid may be distributed radially within the gas flow path of the turbomachine.

Reverse-Effervescent Effect Embodiment

Figure 11:
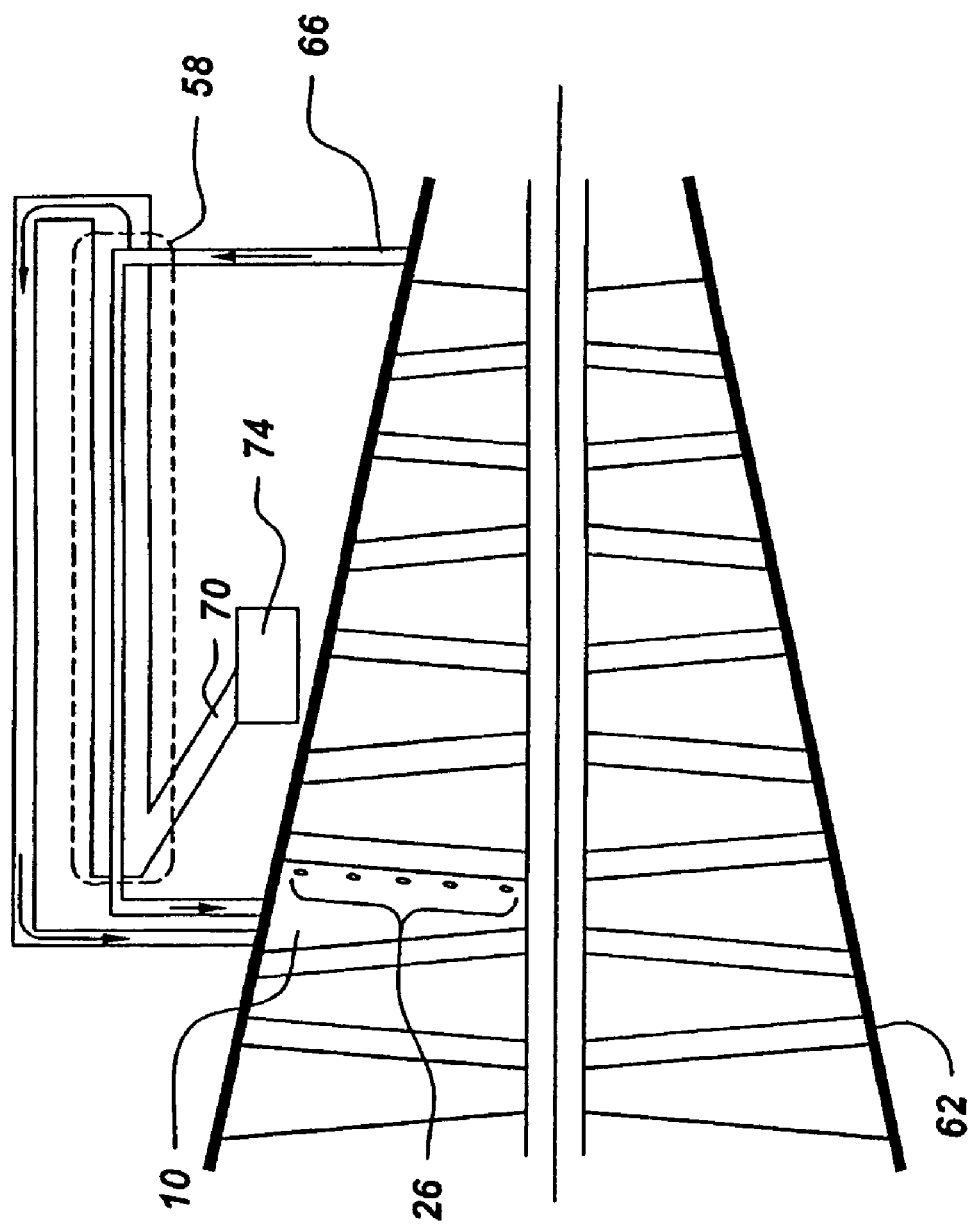
FIG. 11 depicts a schematic view of a turbomachine with a heat exchanger.

It is known in effervescent systems that adding gas bubbles to a liquid assists in the atomization of that liquid. Gas bubbles are formed by flowing a gas stream through small openings in a surface that confines a stream of liquid. However, this embodiment uses what may be described as a reverse-effervescent effect whereby a liquid flows through small openings in a surface that confines a gas, in order to produce an atomized liquid. The advantage of flowing the liquid through the small openings is that less pressure drop is then required to flow the gas stream, and the larger pressure drop for the liquid stream is provided by using less energy than would be required to provide the gas with the same pressure drop.

FIG. 5 shows a reverse-effervescent embodiment of the disclosed apparatus. In this embodiment, a stator blade 10 is shown with an orifice surface 18. There is a fluid channel 14 that delivers liquid to the stator blade and out the orifice surface 18 through an orifice 26. However, in this embodiment, there is also a gas channel 38 with an opening 42 either at or near a max pressure surface 46 of the stator blade 10. The fluid channel 14 forms an annulus 50 around the gas channel 38. In one embodiment, the annulus has an outer diameter of about 0.125 inches and the porous surface of the annulus may be created with a stainless steel tube of about 0.5 inches in length, with a diameter of about 0.0625 inches with about 20 to 50 holes distributed on the tube's surface, the holes being about 10 to 100 microns in diameter. This tube has an equivalent porosity in the range of about 0.01% to about 0.4%, where porosity is the fraction of bulk volume of a material consisting of pore space. In another embodiment, the porous surface may be created by a sintered stainless steel tube with an equivalent porosity of about 0.01% to about 0.4%. In still another embodiment, the porous surface may be a mesh screen with an equivalent porosity of about 0.01% to about 0.4%. The liquid supplied to the fluid channel 14 may be a liquid under high pressure.

Gas from the turbomachine gas flow path enters the stator 10 through the opening 42 at or near the max pressure surface 46. The opening 42 communicates the gas into gas channel 38. The high-pressure liquid enters through fluid channel 14 and passes through the porous annulus 50 into the gas channel 38 where it mixes with the gas. There is a pressure drop as the liquid passes through the porous annulus 50, which helps atomize the liquid as it mixes with the gas in the gas channel 38. The mechanism of atomization used in a porous material such as a sintered stainless steel, is similar to the atomization mechanization of simply pushing a liquid through an orifice in order to atomize the liquid. A sintered material, such as sintered stainless steel is comprised of many small pathways, which in essence act as many orifices. A relatively high pressure drop is required for the liquid to pass through the sintered surface, but the power requirement for a compressed liquid is less than that for a compressed gas at the same pressure drop. In one embodiment where the turbomachine is a 175 MW gas turbine, the pressure may be about 3,000 psia.

The pressure drop across the stator blade 10 from the max pressure surface to the orifice surface, is what pushes the liquid/gas mixture through the atomizer. The liquid/gas mixture exits the gas channel 38 via the orifices 26, where another pressure drop occurs which also provides more atomization to the liquid. FIG. 6 shows a top view of the stator blade 10 shown in FIG. 5.

In another embodiment of the reverse-effervescent apparatus, rather than using gas from the turbomachine entering the opening 42 of the stator blade 10, a gas from an external source may be supplied to the gas channel 38. The gas may be supplied to the stator blade 10 in a manner similar to the way liquid is supplied to the fluid channel 14.

Porous Medium Embodiment

FIG. 7 illustrates another embodiment of the disclosed apparatus. A partial cut-away view of a stator blade 10 is shown extending from the blades base 54, which is inserted into an inner shell of a turbomachine. Located within the stator blade is a fluid channel 14, which feeds water to the interior of the stator blade 10. In this embodiment the interior of a stator blade comprises a porous medium. In another embodiment, the porous medium may be a sintered stainless steel with a porosity equivalent to about 0.016% to about 0.4%. The porous medium of stator blade 10 is exposed to the gas flow path at the stator blade's max pressure surface 46. Similarly at the orifice surface 18 of the stator blade, there is an exposed porous medium. The gas in the turbomachine enters the stator blade 10 at its max pressure surface 46 through the exposed porous medium. The gas mixes with the liquid supplied by the fluid channel 14 within the porous medium of the stator blade 10 where the liquid is atomized. The mixture of gas and atomized liquid exits the stator blade 10 through the orifice surface 18 and enters into the flow of the turbomachine. FIG. 8 shows a top view of the stator blade 10 from FIG. 7.

FIG. 9 illustrates another embodiment of the disclosed apparatus. Stator blade 10 comprises a porous medium only on its orifice surface 18. The interior of the stator blade 10 comprises a stator blade cavity 48. Liquid is supplied to the stator blade cavity 48 via the fluid channel 14. Therefore, when the fluid channel supplies liquid to the stator blade cavity 48, the liquid will exit the cavity 48 through the porous medium on the orifice surface 18 where it is atomized as it enters the flow of the turbomachine. FIG. 10 shows a top view of the stator blade 10 shown in FIG. 9. The orifice surface of the stator blade 10 comprises a porous medium. The remainder of the outer surface of the stator blade may be standard non-porous material normally used in the fabrication of stator blades.

Heat Exchanger Embodiment

In this embodiment, the use of at least one stage of stator blades with gas-assisted atomizers to introduce atomized liquid into the gas flow path of a turbomachine is combined with a heat exchanger in order to both heat the liquid to be atomized and to cool the gas used to assist in the atomization process. As discussed above, the work required by an axial-flow turbomachine, such as, but not limited to, a compressor is reduced if the main compressor gas flow is cooled by injecting a liquid which evaporates in the gas flow path. The more evaporation that takes place, the greater the cooling. Thus, to increase evaporation, it is desired to heat the injected liquid so that it will more readily evaporates due to a reduction of the surface tension in the liquid droplets. Additionally, if the atomizing gas is cooled, its density and viscosity is increased. Therefore, when the atomizing gas with a very high velocity interacts with the liquid, a larger sheer stress will develop on the interface between the gas and the liquid due to the increased density and viscosity of the gas. This larger sheer stress sets up larger perturbations in the liquid, and causes an increased atomization of the liquid. The amount of cooling capacity lost in the pre-heating of the liquid is much smaller than that gained in the evaporation process as the latent heat of vaporization is much greater than the specific heat.

FIG. 11 is a schematic drawing illustrating an embodiment of the heat exchanger apparatus. A turbomachine 62 is shown. A gas line 66 obtains heated and compressed gas from a late stage area of the turbomachine. Liquid is pumped into the system through a fluid line 70 via a pump 74. Gas line 66 and fluid line 70 coupled to a heat exchanger 58. The heat exchanger 58 thus uses the heated and compressed gas from gas line 66 to heat the liquid from the fluid line 70. Similarly, the relatively cool liquid in fluid line 70 cools the heated and compressed gas in gas line 66. Once through the heat exchanger 58 the cooled gas and heated liquid is directed to the stator blade cavity 48. Inside the cavity 48, the cooled gas is an atomizing gas because it has a high relative velocity as it interacts with the liquid in the cavity. The atomized liquid then exits through orifices 26 of the gas-assisted atomizer on the orifice surface of the stator blades 10. The heat exchanger 58 may be selected from, but not limited to, a coil heat exchanger, a plate heat exchanger, or shell-and-tube heat exchanger. An "atomizer", as used in this document, may be made up of simply an orifice, but may additionally include additional hardware, such as, but not limited to: passages for assisting air, swirl vanes for the liquid, and other devices for assisting in atomizing liquid.

In one embodiment where the turbomachine 62 is a compressor that is compressing about 1,000 lb/sec of gas, then approximately 10 lbs/sec of liquid would be injected into the gas flow of the compressor via the stator blades 10 in a particular stage, and approximately 1 lb/sec of atomizing gas would be used in the stator blades 10 in the particular stage. For example, if there are 100 stator blades 10 in the particular stage, and each stator blade 10 is configured with gas-assisted atomizers, then about 0.1 lb/s of water would be injected into the gas flow path per stator blade and each stator blade would use about 0.01 lb/sec of atomizing gas.

Pulsation Embodiment

In this embodiment, the atomization of a liquid is accomplished by pulsing the liquid in a chamber that is in fluid communication with many small orifices. The pulsing is accomplished by vibrating a surface (vibration plate) of the chamber at a very high frequency. Several vibration generators exist for vibrating the vibration plate, some of those are, but not limited to: piezoelectric actuators, bimetallic strips, thermocouples producing temperature fluctuations, or capacitors producing electrostatic pulses.

The pulsing in the liquid chamber provides a mechanism for atomizing the liquid. Instead of using a high velocity gas to interact with a liquid and cause perturbations in the liquid thereby creating smaller droplets, this embodiment uses a more direct approach. The liquid is perturbed by the vibration of the vibration plate, thereby causing the liquid to break up into smaller droplets. An advantage of using a piezoelectric actuator is that less auxiliary power is required as compared to gas-assisted atomizers. Another advantage is the small size of the pulsating atomizer.

Figure 12:
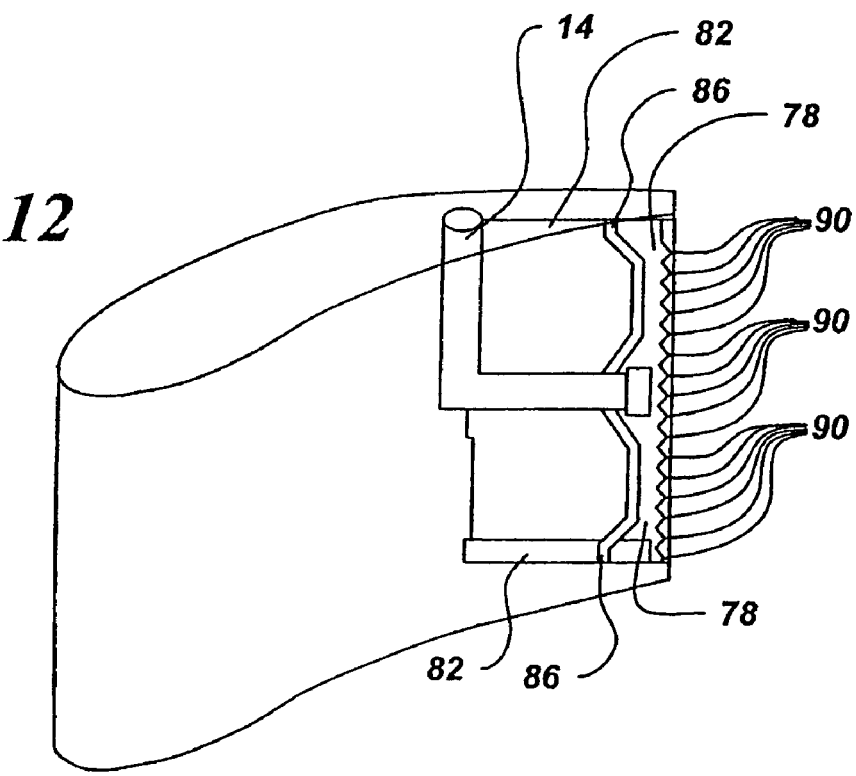
FIG. 12 depicts a perspective view of a stator blade with a pulsation apparatus.

FIG. 12 shows an embodiment of the disclosed pulsation apparatus. A stator blade 10 is shown with a fluid channel 14 supplying liquid to two chambers 78. Each of the chambers 78 is acted upon by a piezoelectric actuator, 82. The piezoelectric actuators 82 repeatedly actuate causing the vibration plate 86 to move in such a way that the liquid in the chambers 78 experience pressure waves, also known as pulsations, caused by the movement of the vibration plate 86. In one embodiment, the rate of pulsation would be about 1 to 10 MHz and the entering liquid pressure would be about 30 psia. The action of the pressure waves on the liquid in the chambers 78 assist in atomizing the liquid as they leave through small orifices 90. The orifices may be on the order of 10 microns in diameter. The thickness of the pulsating atomizer may be on the order of 100 microns, and the length may be on the order of 5 inches. Such a pulsating atomizer could be attached to the surface along the trailing edge of an otherwise unmodified stator vane without disturbing the aerodynamic properties of the stator vane.

Figure 13:
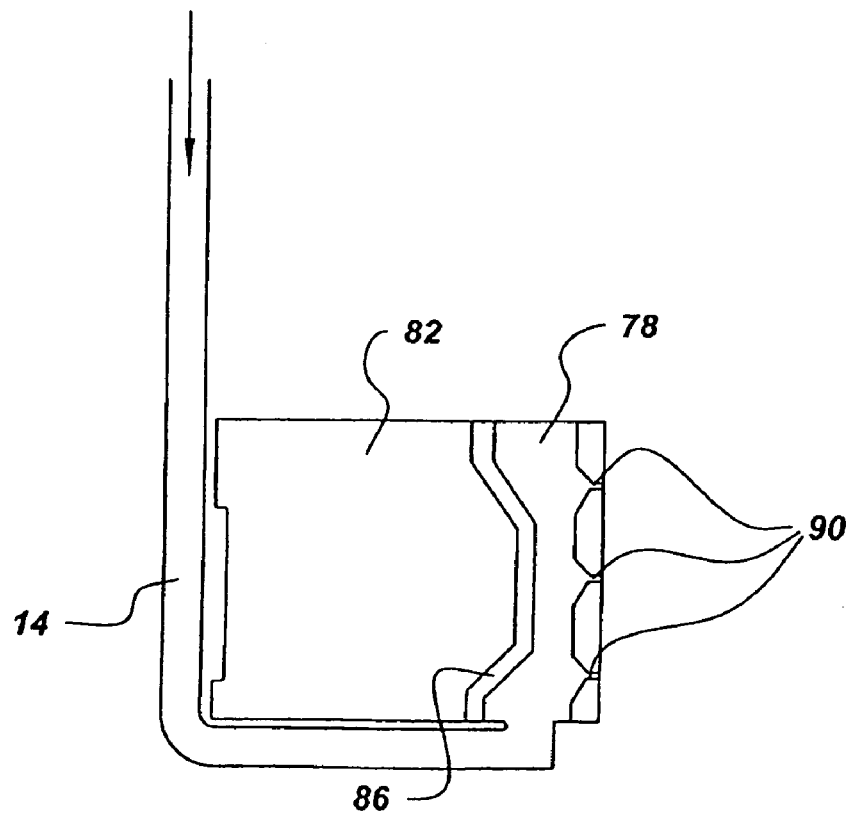
FIG. 13 depicts a close up view of the pulsation apparatus from FIG. 12.

FIG. 13 is a close up view of one of the piezoelectric actuators 82. In this view one chamber 82 supplied by a fluid channel 14, vibration plate 86, piezoelectric actuator 82 and three small orifices 90 are shown. The piezoelectric actuator is repeatedly actuated to cause the vibration plate 86 to move in such a way to create pressure waves in the liquid in the chamber 78 such that when the liquid exits through the small orifices 90, the liquid will be atomized.

Plenum Cavity Embodiment

Turbomachines may be newly manufactured to incorporate the embodiments discussed above. The casing may be manufactured to supply stator blades 10 with a liquid from an external supply. One known way to supply liquid to the internals of a turbomachine is to create a plenum cavity in the casing during manufacture with a set number of external port connections for receiving the liquid from an external supply. The plenum cavity extends around the entire circumference of the casing and is able to distribute the flow of liquid around the entire circumference of the turbomachine. However, in a service retrofit when this cavity has not been created as an integral part of the casing, a plenum cavity must be created. In the past a plenum cavity was created using external piping around the casing with ports drilled through the casing to deliver the external liquid. This method is practicable when a small number of ports can be used, but in cases when a large number of ports are required, this method is not effective. For example, if external liquid is to be communicated to the interior of every stator blade in a 100-blade stage of a turbomachine, then 100 ports would need to be drilled in the casing. This high number of ports may give rise to a structural integrity risk, therefore it is desired to reduce the number of such ports.

Figure 14:
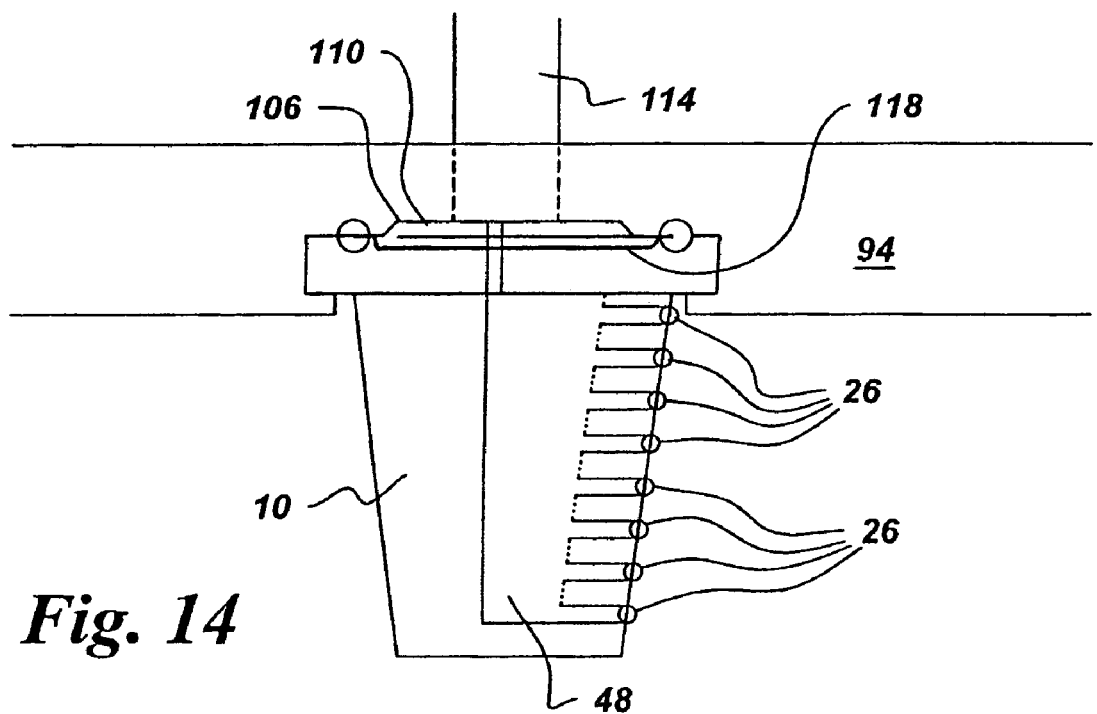
FIG. 14 depicts a side view of a stator blade and casing with a plenum cavity.

FIG. 14 shows a plenum cavity embodiment of an apparatus for the distribution of liquid to the internals of a turbomachine. This embodiment may be especially useful for a service retrofit of a turbomachine. In FIG. 14, a casing 94 and a stator blade 10 are shown. The interior surface of the casing has a casing groove 106 circumferentially machined into the entire 360 degree circumference of the interior casing surface. In the currently disclosed embodiment, the casing groove extends through the entire 360 degrees of the turbomachine casing, however, in other embodiments there may be two casing grooves each covering approximately 180 degrees of the casing, or three grooves, with each groove covering approximately 120 degrees of the casing, and so on. The casing groove 106 forms a plenum cavity 110 that extends the entire circumference of the turbomachine. The plenum cavity 110 may be fed liquid from an external source by a single or multiple ports 114. It is important to note there may be as few as one port 114 that supplies the entire circumference of the plenum 110, thus allowing for a limited number of ports to be drilled through the casing 94, and thereby preserving the structural integrity of the casing. The mating surfaces between the casing 94 and stator blade 10 may be sealed by a pair of static seals 118, such as, but not limited to, a rope seal. Other seals that may be used include metals with a thermal expansion coefficient greater than that of the casing or stator blades and high temperature epoxies. In addition, there may exist an inter-blade gap due to the stator blades 10 being individual blades stacked against each other in assembly and thereby creating a potential leakage path in fluid communication with the groove 106. This inter-blade gap may be sealed by a static seal 122 between each pair of blades. The static seal 122 may be, but is not limited to, a rope seal. Additionally, a seal made of metal with thermal expansion coefficient greater than that of the casing or stator blades may be used or a high temperature epoxy. The sealing of the aforementioned leakage paths is important as any leakage can cause uncontrolled atomization of the leaking fluid and the resulting leaked fluid can atomize at droplet sizes large than The plenum cavity 10 is in communication with a stator, blade cavity 48. The stator blade cavity 48 is in communication with orifices 26 of any of the previous atomization embodiments near the orifice surface of the stator blade 10.

Figure 15:
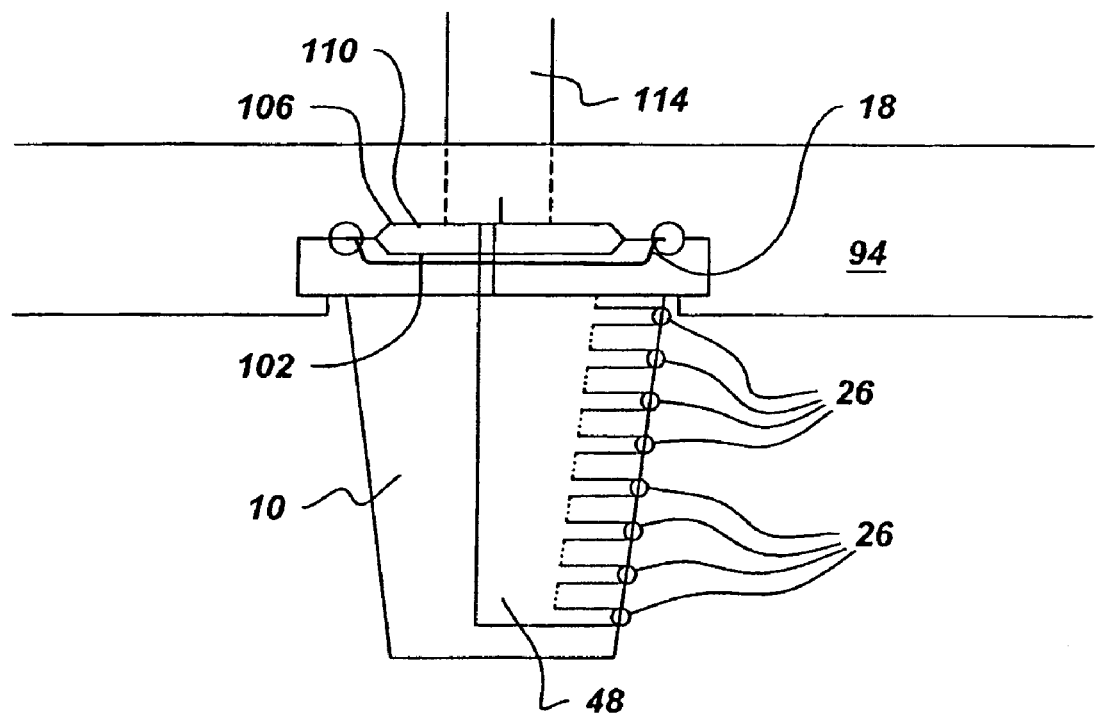
FIG. 15 depicts another embodiment of a stator blade and casing with a plenum cavity.

FIG. 15 shows another embodiment of the plenum cavity disclosure. In this embodiment, there is also a groove 102 machined into the top surface of each stator blade in a stage of the turbomachine. In other embodiments, fewer than all of the stator blades may have the stator blade groove 102 machined into it, for instance, every other stator blade may have a groove machined into, thus forming a larger plenum cavity at every other stator blade.

A method for retrofitting this embodiment to a turbomachine is described next. An upper casing is removed from the turbomachine. A casing groove 106 is machined into a 360 degree circumference of an internal surface of the casing. At least one port 114 is machined into the casing that is in fluid communication with the casing groove 106. A stator blade cavity 48 and orifices 26 are machined into at least one stator blade in a stage of the turbomachine. The turbomachine is reassembled with the at least one port 114 coupled to an external channel which supplies liquid to the now formed plenum cavity 110.

In one embodiment, the casing groove 106 is 1.5 inches wide and 0.25 inches deep. In an other embodiment where there is also a stator blade groove, then the casing groove is 1.5 inches wide and 0.125 inches deep, and the casing groove is 1.25 inches long, 0.125 inches deep, and 0.25 inches wide. The orifices 26 may be 10 mils in diameter.

Bayonet-Like Tube Embodiment

In another embodiment of the disclosed apparatus, a perforated bayonet-like tube is placed in the wake region of one or many stator blades. Introducing liquid as an intercooling medium through a bayonet-like tube in the wake region of one or many stator blades, minimizes any adverse aerodynamic impact. Another advantage of this disclosed embodiment is that this embodiment may be retrofitted onto existing turbomachines without extensive modification of other components like the stator blade itself.

Figure 16:
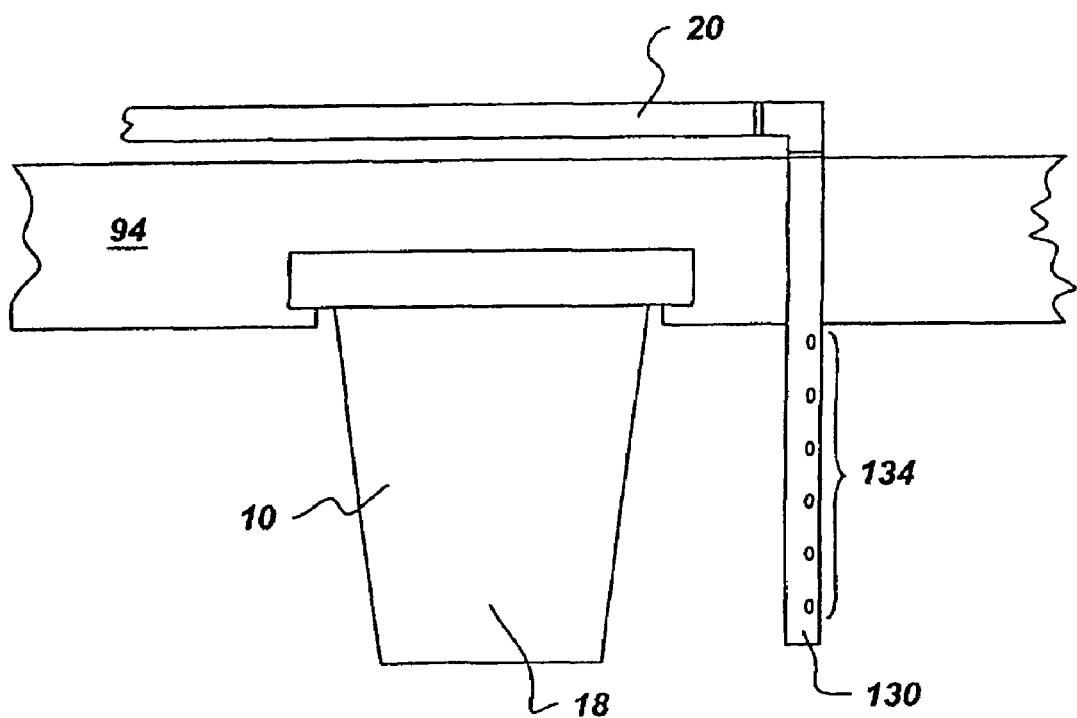
FIG. 16 depicts a side view of a stator blade and a bayonet-like tube.
Figure 17:
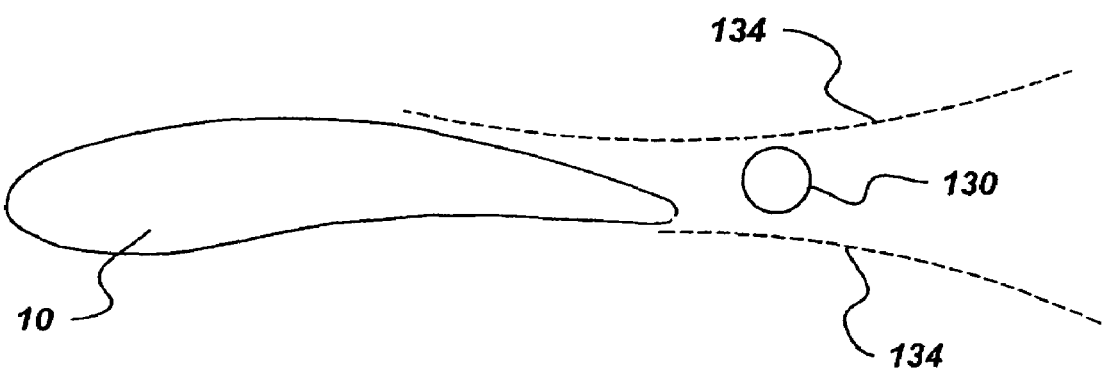
FIG. 17 depicts a top view of a stator blade and a bayonet-like tube.

FIG. 16 shows an embodiment of the bayonet-like tube apparatus. A stator blade 10 is shown extending from a casing 94. Proximate to the orifice surface 18 of the stator blade 10 is a bayonet-like tube 130 also extending from the casing 94. The bayonet-like tube 130 has small outer diameter so that it will be located completely within the wake of the stator blade 10. In one embodiment, the bayonet-like tube's 134 outer diameter is about 0.25 inches. The bayonet-like tube 130 is perforated with orifices 26. The orifices 26 face in a direction for maximum atomization or for maximum wake momentum increase. FIG. 17 shows a top schematic view of a stator blade 10 and bayonet-like tube 130. The dashed lines 134 represent the wake trail of the gas flow coming off the stator blade 10.

As can be seen in FIG. 17, the bayonet-like tube 130 is positioned within the wake shown by the dashed lines 134. In one embodiment, the orifices may be about 10 mils in diameter. An aerodynamic benefit may be attained by the bayonet-like tube if it fills the momentum defect of the wake with the momentum surplus of the liquid supplied by the bayonet-like tube. The bayonet-like tube may be combined with the heat exchanger embodiment, in that instance instead of transmitting the heated liquid and cooled gas through a stator blade from a heat exchanger, the heated liquid and cooled gas may be transmitted through a bayonet-like tube.

High-Pressure Area Nozzle Embodiment

It has been recently discovered that if the fluid enters the gas flow path of the turbomachine near a high pressure surface of the stator blade, that atomization may also take place when the fluid exits the nozzle and interacts with the gas flow which is going in a direction opposite or nearly opposite to the fluid flow. Thus in another embodiment nozzles may be located on or near a high pressure surface of the stator blades, to introduce the fluid into the oncoming gas flow, thereby leading to good atomization of the fluid.

While the above embodiments have discussed introducing a liquid into the gas flow path of a turbomachine, similar advantages may be achieved by introducing a cooled gas (such as, but not limited to cooled nitrogen gas) into the flow path of the turbomachine in order to cool the gas flow within the turbomachine. Thus, all of the embodiments described above may include the introduction of a gas as well as a liquid into the gas flow path of a turbomachine.

While the embodiments of the disclosed method and apparatus have been described with reference to exemplary embodiments, it will be understood by those skilled in the art that various changes may be made and equivalents may be substituted for elements thereof without departing from the scope of the embodiments of the disclosed method and apparatus. In addition, many modifications may be made to adapt a particular situation or material to the teachings of the embodiments of the disclosed method and apparatus without departing from the essential scope thereof. Therefore, it is intended that the embodiments of the disclosed method and apparatus not be limited to the particular embodiments disclosed as the best mode contemplated for carrying out the embodiments of the disclosed method and apparatus, but that the embodiments of the disclosed method and apparatus will include all embodiments falling within the scope of the appended claims.

The invention claimed is:

1. An apparatus for distributing an atomized fluid in a gas flow path inside a turbomachine, the apparatus comprising:
   a heat exchanger configured to heat a fluid from an external source;
   at least one stator blade in at least one turbomachine stage, the stator blade comprising a cavity throughout a portion of its interior;
   at least one atomizer located at an orifice surface of the stator blade, the atomizer communicatively coupled the cavity; and
   wherein the stator blade is communicably coupled to the heat exchanger to accept heated fluid into the cavity whereupon the heated fluid exits the cavity through the atomizer orifice and enters the gas flow path of the turbomachine.

2. The apparatus of claim 1, wherein the orifice surface is on a low pressure surface of the stator blade.

3. The apparatus of claim 1, wherein the heat exchanger is further configured to use gas from the turbomachine to heat the fluid.

4. The apparatus of claim 3, wherein the heat exchanger is further configured to use the fluid to cool the gas from the turbomachine.

5. The apparatus of claim 4, wherein the stator blade is communicably coupled to the heat exchanger to accept heated fluid and cooled gas into the cavity such that the cooled gas assists in atomizing the heated fluid, prior to the heated fluid exiting the cavity through the orifice and entering the gas flow path of the turbomachine.

6. The apparatus of claim 3, wherein the gas is from a late stage area of the turbomachine.

7. The apparatus of claim 1, wherein the stator blade is located at a mid stage of the turbomachine.

8. The apparatus of claim 1, wherein the stator blade is located at an early stage of the turbomachine.

9. The apparatus of claim 1, wherein every stator blade in the at least one turbomachine stage is configured in the same manner as the at least one stator blade.

10. An apparatus for distributing a fluid in a gas flow path inside a turbomachine, the apparatus comprising:
- a heat exchanger configured to heat a fluid from an external source;
- at least one stator blade in at least one turbomachine stage;
- a tube located proximate to an orifice surface of the stator blade;
- at least one orifice located on a side of the tube, and
- the orifice communicatively coupled the cavity; and
- wherein the tube is communicably coupled to the heat exchanger to accept heated fluid into the cavity whereupon the heated fluid exits the cavity through the orifice and enters the gas flow path of the turbomachine.

* * * * *